May 2, 1961 W. R. COBB ET AL 2,982,114
REFRIGERATED WATER DISPENSER
Filed Aug. 29, 1958

INVENTORS
WILLIAM R. COBB
JAMES K. NELSON
BY *William J. Foley*
ATTORNEY

United States Patent Office 2,982,114
Patented May 2, 1961

2,982,114

REFRIGERATED WATER DISPENSER

William R. Cobb, Columbus, and James K. Nelson, Grove City, Ohio, assignors to Westinghouse Electric Corporation, East Pittsburgh, Pa., a corporation of Pennsylvania Filed Aug. 29, 1958, Ser. No. 758,040

6 Claims. (Cl. 62—338)

This invention relates to water dispensers for use with refrigerators.

Water dispensers used with refrigerators usually are carried by the cabinet or cabinet door of the refrigerator, and comprise: a liquid tank, an outlet tube including a valve for dispensing cooled water from the tank and, preferably, automatic means for refilling the tank with fresh water. Various automatic refilling means have been proposed in prior art structures, the most common being the type in which the tank is directly connected to a pressurized fresh water pipe, so that the water stored in the tank is under pressure from the fresh water supply system; the arrangement being such that opening the flow valve causes cool water to be discharged from the tank as fresh water enters. While this type of automatic refilling means has proved to be convenient and operationally successful, the main disadvantage is high cost, since it must be capable of withstanding high pressures and entails expensive pressure vessel construction. Preferably, therefore, the refilling means should be automatic, but relatively inexpensive to manufacture.

In accordance with this invention, there is provided an improved water dispenser arrangement which utilizes an inexpensive, non-pressurized storage tank which need not be connected in any manner to the water supply system. Briefly, the arrangement comprises a water storage tank having an upwardly extending, vented standpipe which communicates with the interior of the tank, an outlet for the tank at the lower region of the standpipe, and manually controlled means for introducing water into the tank. The standpipe is substantially smaller in horizontal cross-sectional area than the tank, so that the introduction of water into the tank causes the level of water to rise rapidly in the standpipe and provide a pressure head for the discharge of water through the outlet.

Preferably, the standpipe additionally serves as an inlet passage through which fresh water is introduced to the tank from a supply pipe when a flow control valve in the pipe circuit is opened. The standpipe is funnel-shaped in order to present a large entrance opening to an incoming stream of fresh water and to provide the standpipe with a neck portion of reduced cross-sectional area. Preferably, the outlet is at the elevation of the neck portion of the standpipe, so that a small quantity of fresh water added to the tank will rise quickly in the standpipe and cause a quickly initiated, forceful flow of cooled water out of the tank. Not only does this arrangement eliminate the need for a plumbing connection between the fresh water supply pipe and the tank, since a free stream of water is now directed from the pipe outlet to the standpipe inlet across an air gap, but it permits the tank to be readily removed from stored position for occasional cleaning.

By the water dispenser arrangement of this invention, water is stored and cooled in an inexpensively constructed unpressurized tank. In addition, cooled water is discharged by the addition of fresh water to the tank, so that the tank holds a full supply of water at all times.

The various objects, features and advantages of this invention will appear more fully from the detailed description which follows, taken in connection with the accompanying drawings, forming a part of this application, in which.

Figure 1:
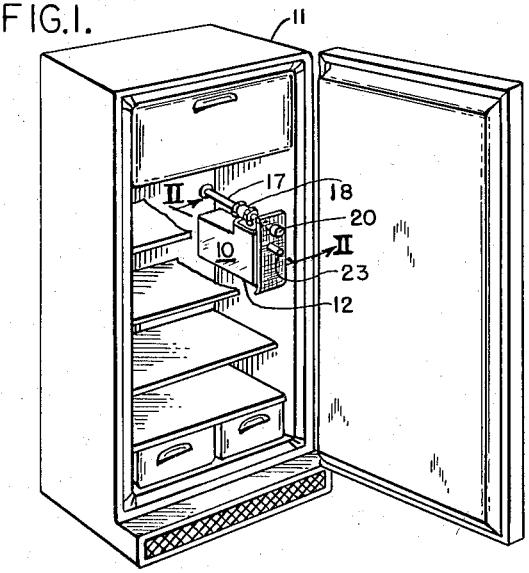
Fig. 1 is a front perspective view of a refrigerator having its door in open position to illustrate the water dispenser of this invention disposed in the food storage compartment.
Figure 3:
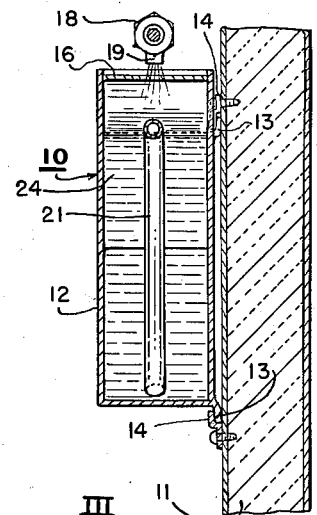
Fig. 3 is a vertical sectional view of the water dispenser taken along line III—III of Fig. 2.
Figure 2:
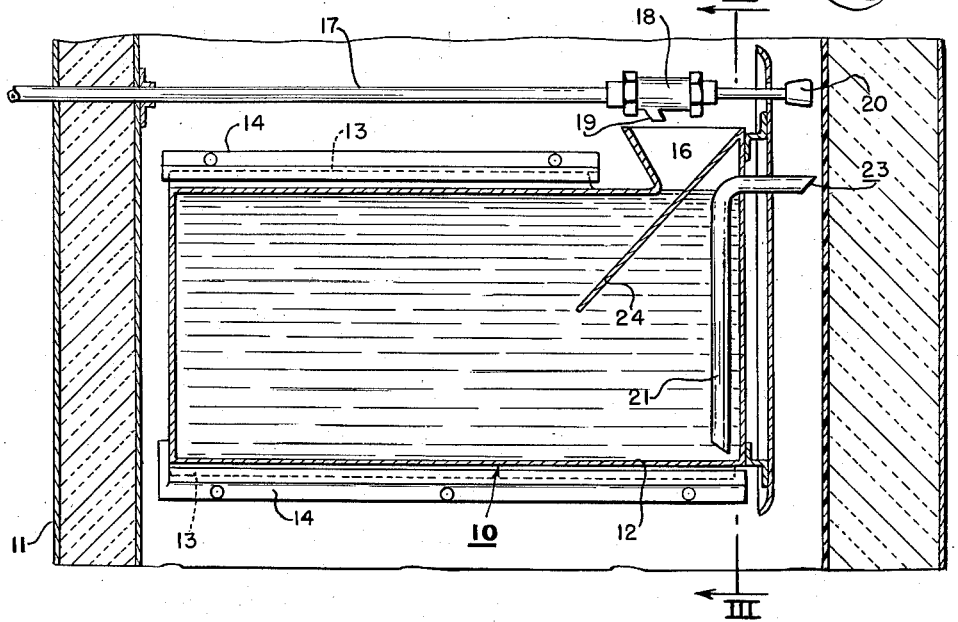
Fig. 2 is a vertical sectional view of the water dispenser, taken along line II—II of Fig. 1.

The water dispenser of this invention is generally indicated by the reference numeral 10 and is adapted for installation in the refrigerated chamber or compartment of a refrigerator cabinet 11. Included in the water dispenser 10 is a water storage tank 12 which is disposed within the refrigerated chamber in heat transfer relationship with the metal liner thereof. The tank 12 is removably and slidably supported by horizontally extending glide brackets 13 which are suitably secured to the interior wall of cabinet 11 and adapted to receive flanges 14 formed in the tank wall. By this arrangement the tank 12 is readily removable for cleaning.

Included in the tank 12, which is otherwise closed at the top, is an upwardly-extending, vented standpipe 16 which communicates with the interior of the tank 12 through the top thereof. The standpipe 16 is funnel-shaped; that is, it converges downwardly and provides an inlet passage through which fresh water is introduced to the tank from a fresh water supply pipe 17. The pipe 17 is connected to the house plumbing system, is stationarily mounted on the cabinet 11, and terminates in a flow valve 18. The flow valve 18 is manually controlled by a movable button member 20 and has an outlet nozzle 19 which directs a free stream of fresh water across an air gap to the standpipe 16.

Cool water is discharged from the tank 12 through an overflow tube 21 having its inlet near the bottom of the tank. The tube 21 extends from within the tank 12, through the tank wall, and has a spout portion exteriorly of the tank which terminates in an outlet 23, at the elevation of a lower region of the standpipe 16. Water is stored in the tank to the level of the outlet 23 of the overflow tube 21. Preferably, the portion of the tube 21 adjacent the outlet 23 extends horizontally through a standpipe wall of the tank 12, at the level of the narrowest portion of the converging standpipe 16, where the horizontal cross-sectional area of the standpipe 16 is many times smaller than the horizontal area of the tank 12. When the tank 12 is full, to the level of the tube outlet 23, and a small quantity of fresh water is supplied to the standpipe 16, the added water quickly rises in the standpipe 16 because the tank 12 is otherwise closed at the top, thereby creating a pressure head that very quickly initiates the flow of cool water through the overflow tube 21. In order to prevent water overflowing the standpipe 16, the flow area of the tube 21 is made sufficiently large so that water flows out the outlet 23, under the pressure head of a full standpipe 16, faster than the maximum rate at which fresh water can be discharged from the nozzle 19. When the valve 18 is closed, the flow of cool water through the outlet of the tube 21 stops almost as quickly as it was initiated. To insure that the flow starts and stops quickly, the overflow tube outlet is located at or above the elevation of the lower end of the standpipe 16.

For the convenience of the user, the valve control button 20 and the tube outlet 23 are arranged one next to the other at the front of the refrigerator cabinet, where they are easily accessible for filling a glass or other suitable container. And to insure that the relatively warm fresh water does not give up heat to the cool water in or surrounding the tube 21, a baffle 24 is provided to partition the incoming water therefrom.

It will be apparent from the foregoing that an improved water dispenser arrangement for refrigerators has been invented in which inexpensively constructed means for dispensing and simultaneously replenishing water from an unpressurized storage tank has been provided.

While the invention has been shown in but one form, it will be obvious to those skilled in the art that it is not so limited, but is susceptible of various changes and modifications without departing from the spirit thereof.

What is claimed is:

1. The combination of a refrigerator cabinet having a refrigerated chamber therein, a closed-top water storage tank disposed within said chamber, an upwardly-extending, open standpipe communicating with the interior of said tank through the top of the tank, said standpipe having a horizontal cross-sectional area substantially smaller than the horizontal area of said tank, means providing a discharge outlet for said tank at the elevation of a lower region of said standpipe, said tank being vented through said standpipe and said discharge outlet, and manually controlled means for introducing water into said tank to raise the level of water in said standpipe above said outlet and discharge water through said outlet.

2. The combination of a refrigerator cabinet having a refrigerated chamber therein, a closed-top water storage tank disposed within said chamber, an upwardly-extending, vented standpipe communicating with the interior of said tank through the top of the tank, said standpipe having a horizontal cross-sectional area substantially smaller than the horizontal area of said tank, means providing a discharge outlet for said tank at the elevation of a lower region of said standpipe, said tank being open to said chamber through said standpipe and said outlet, and manually controlled means for introducing a free stream of water into said standpipe to raise the level of water in said standpipe above said outlet and discharge water through said outlet.

3. The combination of a refrigerator cabinet having a refrigerated chamber therein, a closed-top water storage tank, means removably supporting said tank within said chamber, an upwardly-extending, vented standpipe carried by said tank and communicating with the interior of the tank, said standpipe having a horizontal cross-sectional area substantially smaller than the horizontal area of said tank, means providing a discharge outlet for said tank at the elevation of a lower region of said standpipe, means including a valve for supplying a free stream of water to said tank, said last-named means being stationarily mounted independently of said tank on said cabinet in a position to direct water into said standpipe when said tank is disposed in said cabinet.

4. The combination of a refrigerator cabinet having a refrigerated chamber therein, a closed-top water storage tank, means removably supporting said tank within said chamber, an upwardly-extending, vented standpipe carried by said tank and communicating with the interior of the tank, said standpipe having a horizontal cross-sectional area substantially smaller than the horizontal area of said tank, means providing a discharge outlet for said tank at the elevation of a lower region of said standpipe, means including a valve for supplying a free stream of water to said tank, said last-named means being stationarily mounted independently of said tank on said cabinet in a position to direct water into said standpipe when said tank is disposed in said cabinet, and a manually movable member disposed in a region adjoining said tank outlet for actuating said valve.

5. A water dispenser arrangement for refrigerators comprising a tank disposed within a refrigerator cabinet and adapted for containing a quantity of water therein, an overflow tube through which water is discharged from said tank, and means for supplying fresh water to said tank; said tank having means defining a converging inlet passage to said tank, said inlet passage including an entrance thereto which is disposed above the level of said quantity of water, said converging passage having a narrow portion substantially smaller in cross-sectional area than the horizontal area of said tank and which is disposed at the level of said quantity of water; said tube having an inlet interiorly of the tank and an outlet exteriorly of the tank substantially at the elevation of said narrow portion of said inlet passage; said fresh water supplying means comprising a pipe for conducting pressurized water therethrough and directing a free stream of water into the entrance of said passage, said pipe terminating in spaced relationship with said passage entrance, and a valve for controlling the flow of fresh water through said pipe.

6. A water dispenser arrangement for refrigerators comprising a tank disposed within a refrigerator cabinet and adapted for containing a quantity of water therein, an overflow tube through which water is discharged from said tank, and means for supplying fresh water to said tank; said tank having means defining a converging inlet passage to said tank, said inlet passage including an entrance thereto which is disposed above the level of said quantity of water, said converging passage having a narrow portion substantially smaller in cross-sectional area than the horizontal area of said tank and which is disposed at the level of said quantity of water; said tube extending through a wall portion of said tank at the elevation of the narrow portion of said passage, said tube having an inlet near the bottom of said tank and an outlet exteriorly of the tank substantially at the elevation of said narrow portion of said inlet passage; said fresh water supplying means comprising a pipe for conducting pressurized water therethrough and directing a free stream of water into the entrance of said inlet passage, said pipe terminating in spaced relationship with said inlet passage entrance, and a valve for controlling the flow of fresh water through said pipe.

References Cited in the file of this patent

UNITED STATES PATENTS

| 1,692,223 | Pinkerton et al. | Nov. 20, 1928 |
| 1,904,782 | Flannagan | Apr. 18, 1933 |
| 2,644,318 | Sebens | July 7, 1953 |
| 2,785,546 | Bauerlein | Mar. 19, 1957 |